(12) United States Patent
Howman et al.

(10) Patent No.: US 7,065,880 B2
(45) Date of Patent: Jun. 27, 2006

(54) HOT DOG SLICER

(75) Inventors: Shelly S. Howman, Roswell, GA (US); Karen Lynn O'Kelley, Woodstock, GA (US)

(73) Assignee: Katie Lane Corp., Atlanta, GA (US)

( * ) Notice: Subject to any disclaimer, the term of this patent is extended or adjusted under 35 U.S.C. 154(b) by 369 days.

(21) Appl. No.: 09/999,107

(22) Filed: Oct. 31, 2001

(65) Prior Publication Data

US 2003/0079350 A1 May 1, 2003

(51) Int. Cl.
*A21C 5/08* (2006.01)
*A21C 15/04* (2006.01)

(52) U.S. Cl. .............. 30/114; 30/279.2; 30/303; 83/167; 83/932; 99/537

(58) Field of Classification Search .......... 30/114, 30/124, 278, 279.2, 282, 299, 300, 303, 304, 30/280, 294, 314, 315; 83/167, 932, 44, 83/45, 46, 47, 613; 99/537; D7/693
See application file for complete search history.

(56) References Cited

U.S. PATENT DOCUMENTS

| | | | | | |
|---|---|---|---|---|---|
| 1,917,480 | A | * | 7/1933 | Widing | 312/71 |
| 2,438,304 | A | * | 3/1948 | Slingerland | 83/401 |
| 2,477,493 | A | * | 7/1949 | Olson | 83/761 |
| 2,520,000 | A | | 8/1950 | Dettman | |
| 3,257,725 | A | | 6/1966 | Dignard | |
| 3,465,802 | A | | 9/1969 | Alea | |
| 3,999,293 | A | * | 12/1976 | Zubrycki | 30/124 |
| 4,055,892 | A | * | 11/1977 | Del Vecchio | 30/303 |
| 4,383,365 | A | * | 5/1983 | Metzigian | 30/114 |
| 4,557,053 | A | * | 12/1985 | Hadley, Jr. | 30/114 |
| 4,559,856 | A | * | 12/1985 | Pettus | 39/114 |
| 4,580,343 | A | * | 4/1986 | Bell, Jr. | 30/114 |
| 4,599,928 | A | * | 7/1986 | Oker | 83/581.1 |
| 4,976,029 | A | | 12/1990 | Kennedy | |
| 5,067,241 | A | | 11/1991 | Goodman | |
| D329,967 | S | | 10/1992 | Kennedy | |
| 5,499,578 | A | | 3/1996 | Payne | |
| 5,662,033 | A | * | 9/1997 | Yawman | 99/538 |
| 6,018,876 | A | * | 2/2000 | Hodges et al. | 30/279.2 |
| 6,123,972 | A | * | 9/2000 | Matthews et al. | 83/932 |
| 2002/0100173 | A1 | | 8/2002 | Suer et al. | |

OTHER PUBLICATIONS

"Octodog's Frankfurter Converter, The fun, simple and safer way to turn ordinary hot dogs inot exciting to . . . " copyright 2002-2003, Octodog, Inc., http://www.octodog.net.

* cited by examiner

*Primary Examiner*—Timothy V. Eley
*Assistant Examiner*—Phong Nguyen
(74) *Attorney, Agent, or Firm*—Gardner Groff P.C.

(57) ABSTRACT

A housing with elongate chambers for hot dogs and transverse guide channels extending all the way through the chambers, a longitudinal blade assembly having sets of four radially arranged longitudinal blade sections positioned within the chambers and connected to each other so that the blades simultaneously slide longitudinally between a first position and a second position to slice the hot dogs longitudinally into quarters, and a transverse blade assembly having transverse blades that are received in the channels and connected to each other so that the blades simultaneously slide transversely between a first position and a second position to slice the hot dogs transversely into pieces.

16 Claims, 13 Drawing Sheets

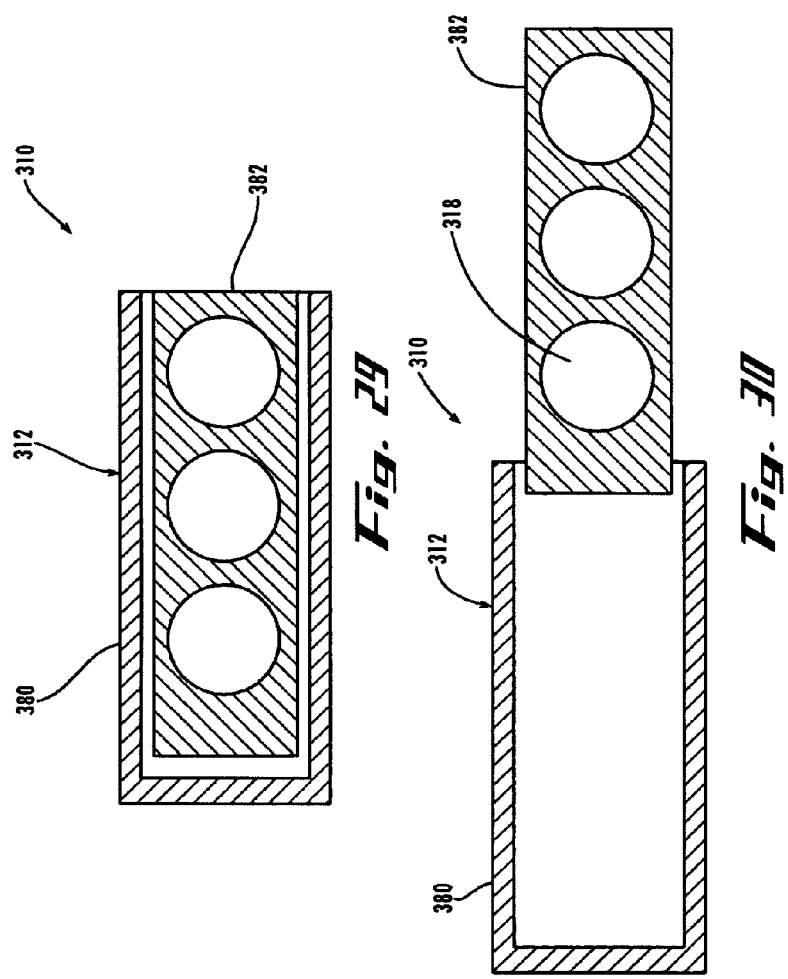

HOT DOG SLICER

TECHNICAL FIELD

This invention relates to food slicing devices and, more particularly, to a slicer with blades for cutting hot dogs into small enough pieces that children do not choke on them.

BACKGROUND OF THE INVENTION

Children have a smaller diameter esophagus than adults, and consequently they choke on their food more often. In particular, hotdogs are the leading choking hazard for children in the United States. Thus, children choke more often on hot dogs than on candy, coins, buttons, marbles, balls, small pieces of action figures or other toys, meat, or any other item. Furthermore, children have died from choking on hot dogs (see The Miami Herald, Miami, Fla., Jan. 7 and 14, 2000). And while most of the time the obstruction is cleared and the child does not die, choking nevertheless is a frightening experience for kids. Choking is especially dangerous at schools and other places with a high child-to-adult ratio because children are generally not as informed and able to recognize that another person is choking and to physically dislodge the obstruction. Because of the risk of choking deaths, many American schools no longer even serve hot dogs, a quintessential American food.

To prevent choking, a child's food should be cut into small pieces. Many kids do not chew their food enough, particularly pieces of meat, so it's best to cut their food into pieces small enough to pass through their esophagus. Because most hot dogs have a diameter that is larger than the diameter of most kid's esophagus, slicing the hot dog into disc-shaped sections of the same diameter does not necessarily eliminate the choking hazard. Many pediatricians therefore recommend that hot dogs be quartered lengthwise in addition to being sliced laterally into discs, so that the resulting pieces are small enough to easily slide down a child's throat. These smaller pieces are therefore much less likely to cause choking in children, as well as elderly persons, pets, or other persons with small throats.

Using a knife to manually cut hot dogs into such small pieces is a rather difficult and tedious task. For schools, camps, day care facilities, and so forth that serve large numbers of kids, such manual slicing is too labor-intensive and time-consuming to be practical. There are several known devices for cutting hot dogs, however, none of them provide for cutting hot dogs into pieces small enough to prevent children from choking. Most of these devices merely provide for cutting slits in the hot dog prior to cooking, and do not provide for cutting all the way through the dog.

Accordingly, what is needed but not found in the prior art is a slicer for cutting hot dogs into pieces that are small enough that children do not choke on them, that can slice multiple hot dogs simultaneously, and that is safe and easy to use. It is to the provision of such a hot dog slicer that the present invention is primarily directed.

SUMMARY OF THE INVENTION

The present invention meets the above-described need by providing an innovative slicer for cutting hot dogs or other food items such as sausages, cucumbers, pickles, carrots, and so forth. Generally described, the slicer has a housing, a longitudinal blade assembly, and a transverse blade assembly. The housing has elongate chambers for the hot dogs and guide channels extending transversely through the chambers. The longitudinal blade assembly includes blade sets positioned within the chambers and connected to each other so that the blade sets slide simultaneously to slice the hot dogs lengthwise. The transverse blade assembly has transverse blades that slide through the guide channels and are connected to each other so that all of the blades slide simultaneously to slice the hot dogs laterally.

The number of chambers and the number and position of blades (longitudinal and transverse) can be selected to provide the slicing desired for a given application. For example, the slicer can have eight chambers for slicing eight hot dogs at once for use at schools, camps, day care facilities, hospitals, and other places where many children are served at once. On the other hand, the slicer can be provided with a smaller number of chambers (such as three) for home use. Alternatively, the slicer can be provided with two rows of chambers, for example, a first row of four chambers and beside that in the housing a second row of four chambers. Also, the size and shape of the chambers can be selected for slicing other food products such as celery or cheese.

In a first preferred embodiment of the invention, each of the blade sets of the longitudinal blade assembly has four blade sections that are arranged radially in the shape of an "X" for slicing the hot dogs into quarters. The blade sets are connected to each other by connecting arms that slide through connecting slots between the chambers inside the housing. A handle is connected to a control arm that is connected to the blade sets and that slides through a control slot in the outside wall of the housing. Thus, by sliding the handle, the blade sets slide through the length of the chambers to slice the hot dogs into quarters. In alternative forms, the handle can extend though the top, end, or side of the housing, multiple handles can be provided, and/or a guide member and slot can be provided for the blade sets.

Also, the blades of the transverse blade assembly are connected to each other by connecting arms, and a handle is connected to a control arm that is connected to the transverse blades. The connecting arms and the control arm slide through a control slot inside the housing that extends through the outside wall of the housing. Thus, by sliding this handle, the transverse blades slide through the guide channels and therefore through the width of the chambers to slice the hot dogs into quarters. In alternative forms, the handle can extend though the top, end, or side of the housing, multiple handles can be provided, and/or a guide member and slot can be provided for the blade sets.

Additionally, the housing is made of a base and a hinged lid each having an interior surface with recessed portions. When the lid is closed, the recessed portions combine to form the chambers. To use the slicer, the lid is opened, hot dogs are placed in the chambers, the lid is closed, and the longitudinal and transverse blade assemblies are operated to slice the hot dogs in the chambers.

In a second exemplary embodiment, the slicer has a transverse blade assembly mounted in the lid of the housing. In this configuration, the blades are forced downward through the hot dogs and retracted back upward into the lid after slicing, instead of being slid sideways across the chambers. In alternative forms, multiple handles can be provided and/or a guide member and slot can be provided for the blades.

In a third exemplary embodiment, the slicer has longitudinal blade sets that are fixed at an end of the chambers, and also includes a paddle assembly having a paddle in each chamber. The paddles are connected together by connecting arms that slide in the connecting slots, and a handle is connected to the paddles by a control arm that slides in a control slot though the sidewall of the housing. To use the slicer, the handle is moved causing the paddles to slide along the length of the elongate chambers which forces the hot dogs in the chambers across the fixed blade sets, thereby slicing the hot dogs into small pieces, and out the end of the chamber. In alternative forms, the handle can extend though the top, end, or side of the housing, multiple handles can be provided, and/or a guide member and slot can be provided for the blade sets.

In a fourth exemplary embodiment, the slicer housing has a base and an insert tray that slides out of the base to load hot dogs and slides back into the base to slice them. In a fifth exemplary embodiment, the slicer housing has only one hot dog chamber, as may be desired for home use. In a sixth exemplary embodiment, the slicer housing has a base and a hinged lid at one of the ends of the base so that the hot dogs can be slid into the chambers through the end of the base and then the lid can be closed before slicing the hot dogs. Other housing configurations can be provided, as may be desired in a particular application.

In view of the foregoing, it will be appreciated that the present hot dog slicer can be used to safely and easily cut several hot dogs at once into pieces small enough that children do not choke on them. Furthermore, the slicer can be operated to quarter hot dogs lengthwise and also slice dogs laterally into disc sections, ensuring that the resulting pieces are smaller than children's throats.

The specific techniques and structures employed by the invention to improve over the drawbacks of the prior devices and accomplish the advantages described above will become apparent from the following detailed description of the embodiments of the invention and the appended drawings and claims.

BRIEF DESCRIPTION OF THE DRAWINGS

FIG. 29 is a longitudinal section view of a fourth exemplary embodiment of the present invention, showing a hot dog slicer having a housing with a base and an insert tray.

FIG. 30 is a longitudinal section view of the hot dog slicer of FIG. 29, showing the insert tray being removed from the base.

DETAILED DESCRIPTION OF THE EXEMPLARY EMBODIMENTS

Figure 1:
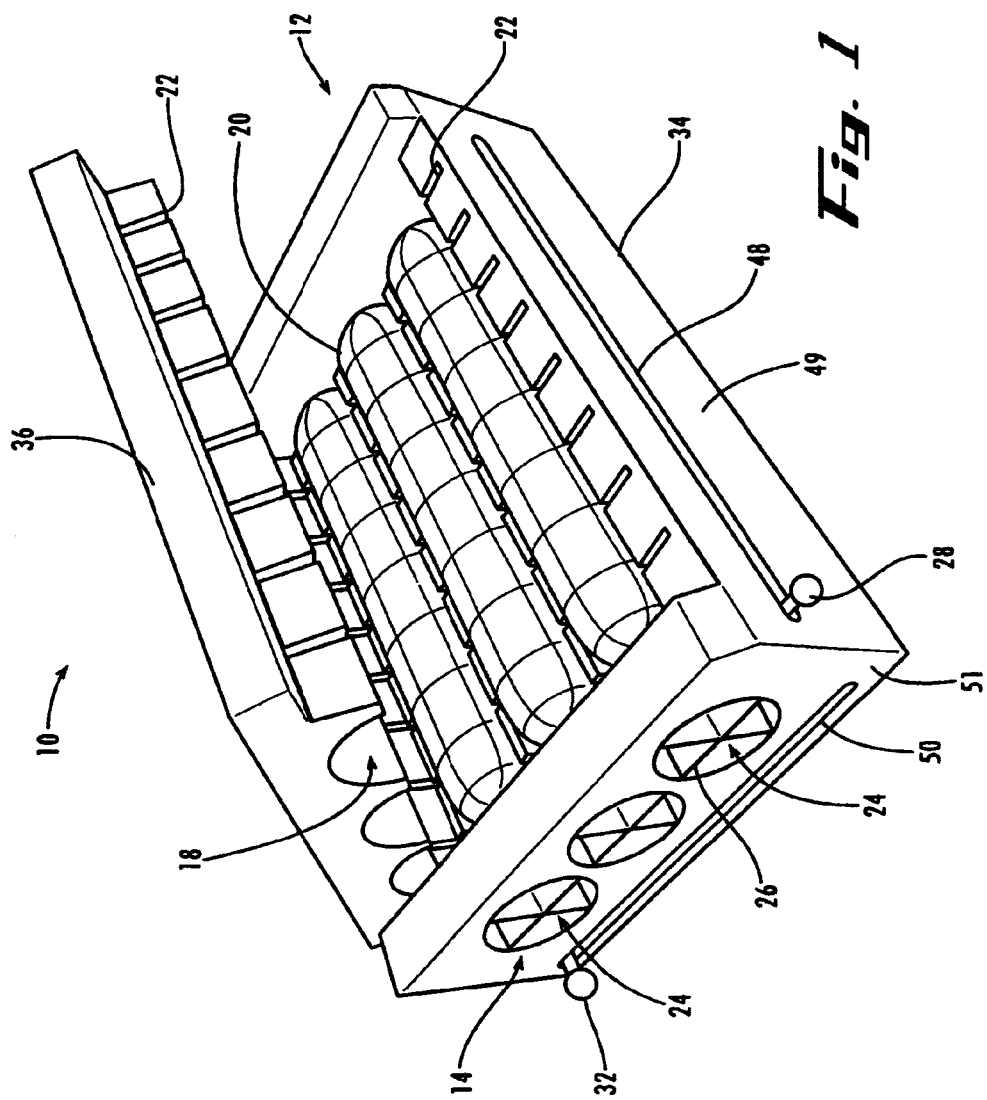
FIG. 1 is a perspective view of a first exemplary embodiment of the present invention, showing a hot dog slicer holding hot dogs that have been sliced longitudinally and transversely by the slicer.
Figure 2:
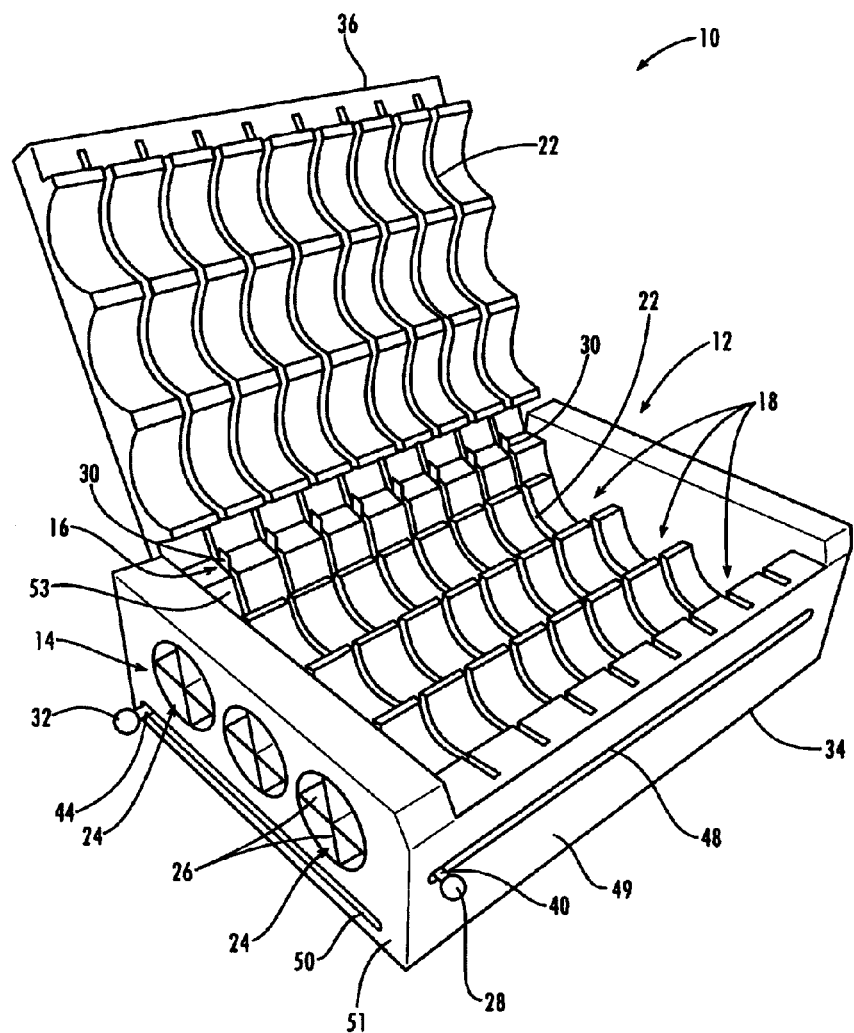
FIG. 2 is a perspective view of the hot dog slicer of FIG. 1, showing the interior surfaces and components of the slicer.

Referring now to FIGS. 1 and 2, there is illustrated a first exemplary embodiment of the present invention, referred to generally as the slicer 10. The slicer 10 has a housing 12, a longitudinal blade assembly 14, and a transverse blade assembly 16. The housing 12 has elongate chambers 18 for hot dogs 20 (shown already sliced into small pieces) and a series of spaced apart transverse guide channels 22. The longitudinal blade assembly 14 has blade sets 24 of four blade sections 26 and a handle 28 operatively connected to the blade sets 24 so that moving the handle 28 moves the blade sets 24 from a first to a second position to slice the hot dogs 20 longitudinally into quarters. The transverse blade assembly 16 has a series of transverse blades 30 that are received in the guide channels 22 and a handle 32 operatively connected to the blades 30 so that moving the handle 32 moves the blades 30 from a first to a second position to slice the hot dogs 20 transversely into pieces.

In this way, the longitudinal blade assembly 14 and the transverse blade assembly 16 permit a user to slice hot dogs 20 both lengthwise into quarters (longitudinally) and sideways through their width (transversely) to end up with small pieces of hot dog that can be safely eaten by children without choking. The longitudinal blade assembly 14 can be operated before the transverse blade assembly 16 or vice versa, or only one of the blade assemblies can be operated if that is all that is desired. Additionally, because the housing 12 has multiple chambers 18 and the longitudinal handle 28 is provided for operating the longitudinal blade sets 24 of each chamber, multiple hot dogs 20 can be quickly and easily sliced at the same time in one operation, so that large numbers of hot dogs can be prepared for serving large numbers of kids in schools, camps, day care, etc. Furthermore, because the longitudinal blades 26 and the transverse blades 30 are recessed within the housing 12, they do not a present safety hazard when putting hot dogs into the chambers or taking the sliced hot dogs out, so the slicer 10 is safe to use.

The slicer 10 can be adapted for use in many different applications. For example, for use in commercial applications, the slicer can have a large number of elongate chambers, a large number of longitudinal blade sets, and longer transverse blades. Such applications would include schools, camps, day care facilities, restaurants, and so forth, where slicers with, for example, eight chambers and blade sets might be provided. The slicer 10 of the embodiment shown has three chambers 18 and blade sets 24, as might be suitable for residential use. Of course, the slicer can be provided with any number of chambers and blade sets as may be desired for a given application.

Also, the slicer 10 is shown with curved chamber walls that form tubular chambers with a length and diameter selected for receiving the hot dogs to be sliced. Alternatively, the tubular chambers can be provided with other lengths and diameters selected for use with other generally tubular food products such as sausages, pickles, cucumbers, zucchini, and so forth. Additionally, the slicer can be used for slicing or dicing celery or carrots, or for cutting up onions, peppers, potatoes, apples, and other food products that have been cut into small enough pieces to fit into one of the chambers. In other forms of the present invention, the slicer has squared chambers for cutting cheese and other items. Of course, the slicer can be provided with chambers having any regular or irregular shape that may be desired for slicing a particular food product. Furthermore, depending on the food product and the desired cutting of it, the slicer can be provided with only one of the blade assemblies, either the longitudinal blade assembly or the transverse blade assembly.

Additionally, the housing 12 can be provided in a variety of different configurations. The housing 12 shown has a base 34 and a lid 36 hingedly coupled to the base, with the base and the lid having interior facing walls that are recessed to cooperatively form the chambers 18 when the lid is swung closed. The housing 12 can be made from a plastic, metal, composite, or other material. It will be understood that the housing can be provided in many other forms, several of which are described below as exemplary embodiments four through six.

Figure 3:
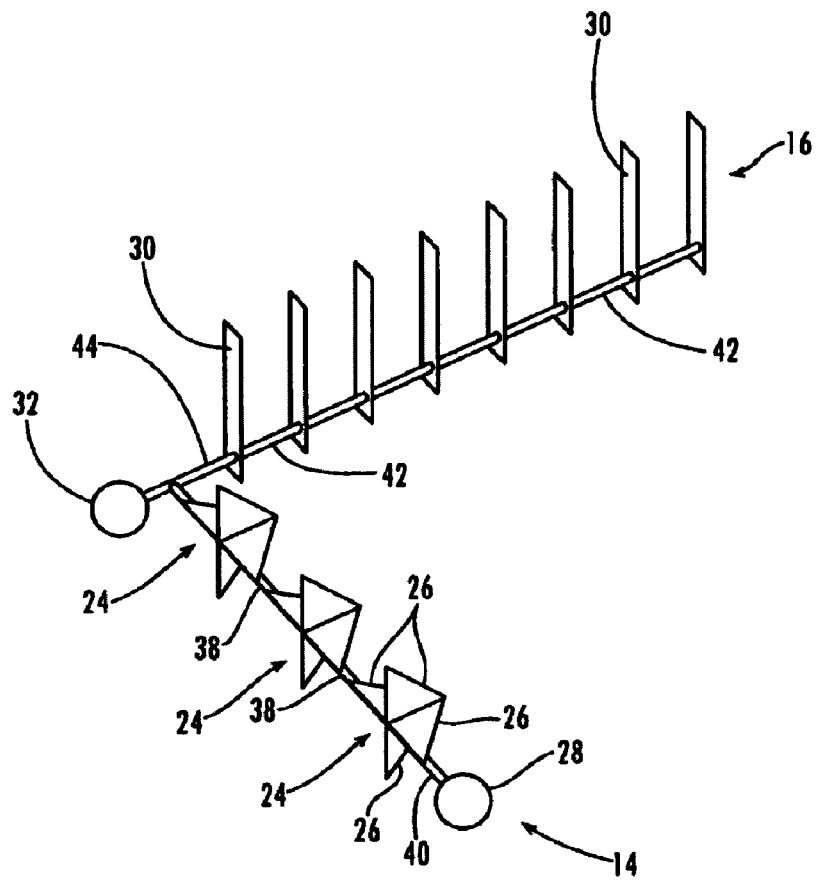
FIG. 3 is a perspective view of a longitudinal blade assembly and a transverse blade assembly of the hot dog slicer of FIG. 1.

Referring now to FIG. 3, the longitudinal blade assembly 14 has one of the blade sets 24 for each chamber 18, so the three-chamber housing 12 shown has three blade sets 24. Each blade set has four blade sections 26 that are radially arranged in the shape of an "X" for slicing one of the hot dogs into quarters. Alternatively, other numbers and configurations of blade sections can be provided depending on the number and position of longitudinal cuts desired. For example, the blade sets 24 can have three blade sections in the shape of a "Y," five blade sections in the shape of a star, or another arrangement. Also, while the blade sections 26 are shown with a triangular profile, they alternatively can be provided with a curved, rectangular, or other shape profile, or can be provided by wire or another cutting edge. Additionally, a connecting arm 38 extends between each of the blade sets 24, a control arm 40 is connected to one of the blade sets 24 (or to one of the connecting arms 38), and the handle 28 is connected to the control arm 40.

Turning now to the transverse blade assembly 16, it has a series of the transverse blades 30 arranged in a row. The slicer 10 is shown with eight blades 30, but another number and position of blades 30 can be selected based on the number and position of lateral cuts desired in the hot dog. For example, the blades 30 can be angled so the hot dogs are cut diagonally instead of perpendicular to the longitudinal axis. Alternatively, two sets of transverse blades can be provided, with an upper blade set in the housing lid, a lower blade set in the housing base, and a linkage that operates to close the blades sets together to slice the hot dogs transversely. While the blades 26 are shown with a rectangular profile, they alternatively can be provided with a curved, triangular, or other shape profile, or can be provided by wire or another cutting edge. Additionally, a connecting arm 42 extends between each of the blades 30, a control arm 44 is connected to one of the blades 30 (or to one of the connecting arms 42), and the handle 32 connected to the control arm 44.

The connecting arms 38 and 42 and the control arms 40 and 44 can be provided by rods, bars, slats, or the like, and can be made of metal, plastic, or another material. The handles 28 and 32 can be provided by knobs, levers, or other hand gripping devices. Where desired, linkages, gears, or other mechanisms can be operatively coupled between the handles 28 and 32 and the blades 26 and 30 for producing the desired travel of the longitudinal and transverse blades 26 and 30. Alternatively, electric motors (or other actuators) can be operatively coupled to the control arms 40 and 44 and provided with electronic (or other) controls for operating the longitudinal blade assembly 14 and/or the transverse blade assembly 16 to slice the hot dogs. Also, the slicer can be provided with a linkage operatively coupled to the transverse blade assembly and the housing so that, when the housing is closed, the transverse blades are engaged and automatically lowered through the chambers to slice the hot dogs.

Figure 4:
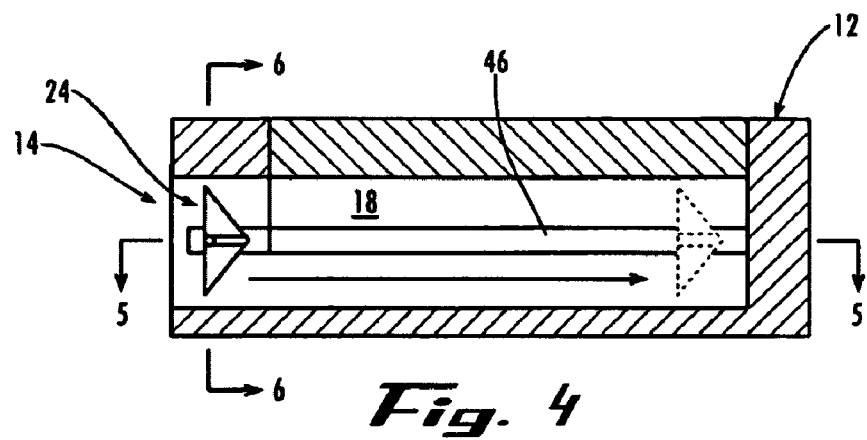
FIG. 4 is a longitudinal section view of the hot dog slicer of FIG. 1, showing the operation of the longitudinal blade assembly.
Figure 5:
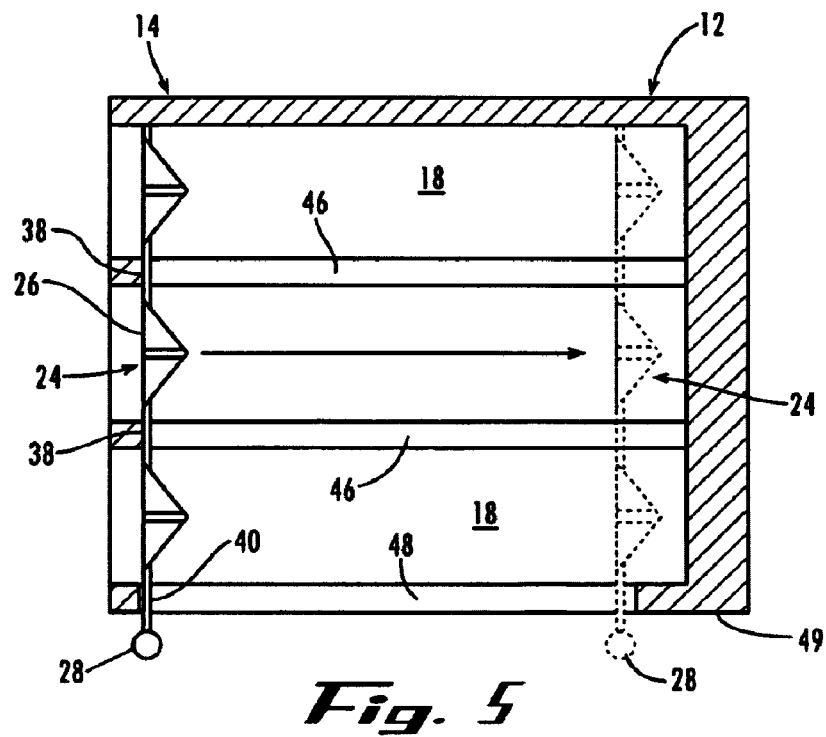
FIG. 5 is a section view of the hot dog slicer taken at line 5—5 of FIG. 4.
Figure 6:
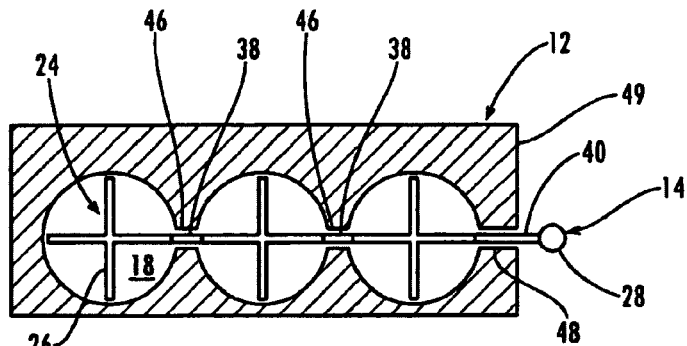
FIG. 6 is a section view of the hot dog slicer taken at line 6—6 of FIG. 4.

Referring now to FIGS. 4–6, the operation of the longitudinal blade assembly 14 is shown in more detail. The housing 12 has a connecting slot 46 defined therein and extending between each of the chambers 18, with the connecting arms 38 movably received in the connecting slots 46. Also, the housing 12 has a longitudinal control slot 48 defined therein, extending through side wall 49, and in communication with one of the chambers 18, with the control arm 40 movably received in the control slot 48. In this configuration, by longitudinally moving the handle 28, the blade sets 24 are longitudinally moved from a first position (shown in solid lines in FIGS. 4 and 5) to a second position (shown in phantom lines), which slices the hot dogs longitudinally into quarters.

It will be noted that each blade set 24 is disposed within one of the chambers 18 with at least one of the blades 26 of that set 24 extending transversely all the way across that chamber 18. In this way, the blades 26 sever the hot dogs into separate pieces, instead of merely making precooking slits a small way into the hot dog as is known in the art. Of course, the blade sets 24 can be provided with only one longitudinal blade extending transversely all the way across that chamber for slicing the hot dog into halves and with other blades for merely cutting slits in the hot dog, if so desired. Also, the outer ends (adjacent the chamber walls) of the blades can slide in grooves in the chamber walls to facilitate smooth operation of the blade assembly 14.

Figure 7:
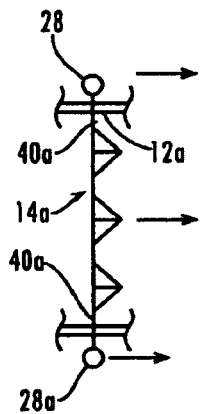
FIG. 7 is a plan view of a first alternative longitudinal blade assembly of the hot dog slicer of FIG. 1.
Figure 8:
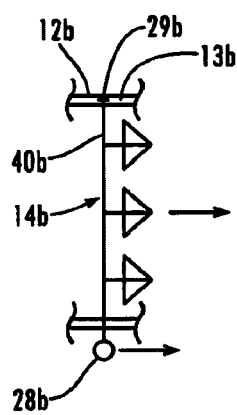
FIG. 8 is a plan view of a second alternative longitudinal blade assembly of the hot dog slicer of FIG. 1.
Figure 9:
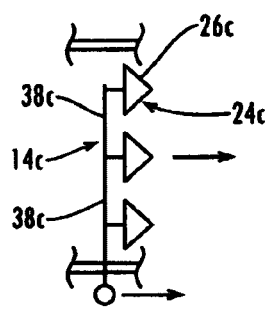
FIG. 9 is a plan view of a third alternative longitudinal blade assembly of the hot dog slicer of FIG. 1.
Figure 10:
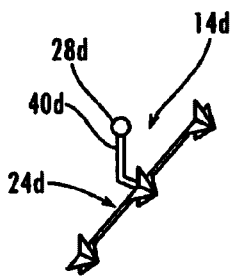
FIG. 10 is a perspective view of a fourth alternative longitudinal blade assembly of the hot dog slicer of FIG. 1.
Figure 11:
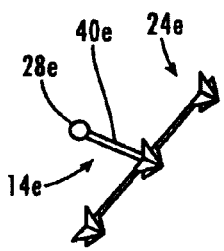
FIG. 11 is a perspective view of a fifth alternative longitudinal blade assembly of the hot dog slicer of FIG. 1.

FIGS. 7–11 show various alternative embodiments of the longitudinal blade assembly 14. FIG. 7 shows a longitudinal blade assembly 14a having two handles 28a attached to two connecting arms 40a extending through the housing 12a, so that the blade assembly 14a can be operated from either side of the housing. FIG. 8 shows a longitudinal blade assembly 14b having a longitudinal guide member 29b extending from one of the connecting arms 40b (or one of the longitudinal blades) and riding in a longitudinal guide slot 13b in the housing 12b, with the guide member 29b oppositely positioned from the handle 28b, for providing a smoother sliding operation of the blade assembly 14b. FIG. 9 shows a longitudinal blade assembly 14c with each blade set 24c having only one blade 26c, and with the connecting arms 38c extending from the backs of the blade sets 24c. FIG. 10 shows a longitudinal blade assembly 14d having the control arm 40d extending from the back of one of the blade sets 24d and turned upward so that the handle 28d extends through and is operated from the top of the housing. Similarly, FIG. 11 shows a longitudinal blade assembly 14e having the control arm 40e extending from the back of one of the blade sets 24e so that the handle 28e extends through and is operated from one of the ends of the housing. It will be understood that the longitudinal control slot, control arm, connecting arms, connecting slots, and handles can be arranged in other ways to accomplish the desired longitudinal slicing.

Figure 12:
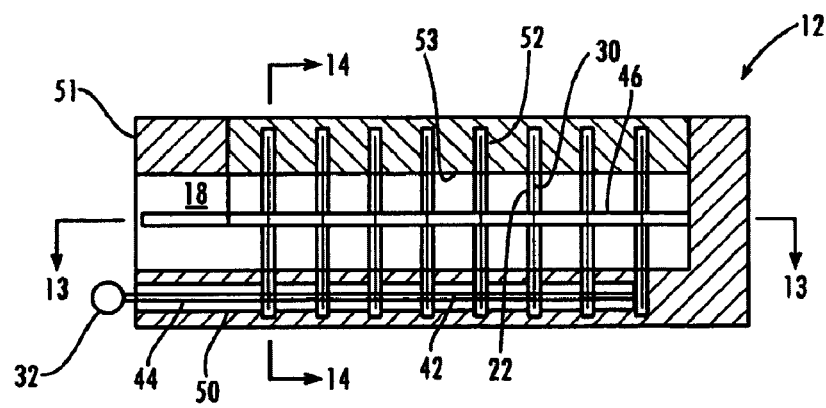
FIG. 12 is a longitudinal section view of the hot dog slicer of FIG. 1, showing the operation of the transverse blade assembly.
Figure 13:
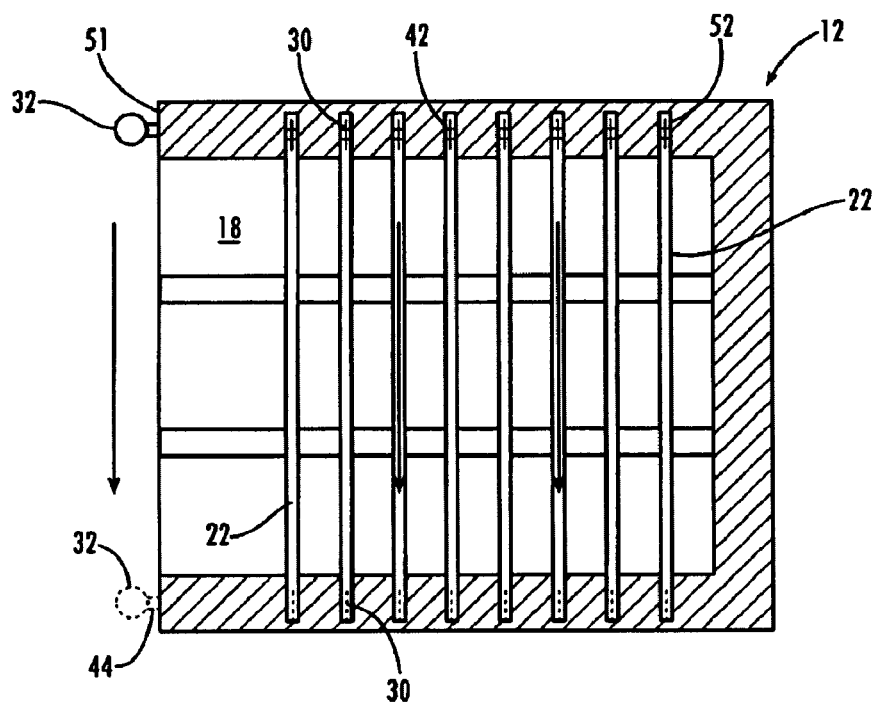
FIG. 13 is a section view of the hot dog slicer taken at line 13—13 of FIG. 12.
Figure 14:
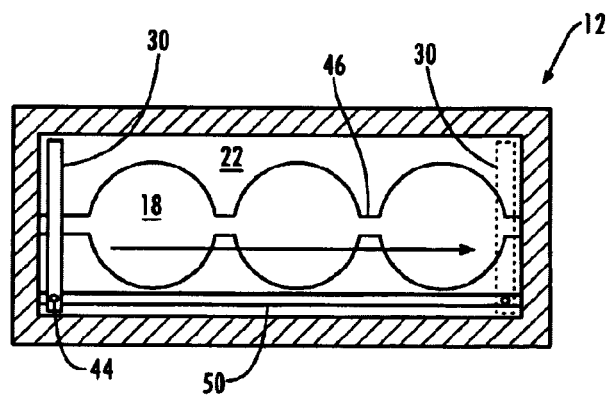
FIG. 14 is a section view of the hot dog slicer taken at line 14—14 of FIG. 12.

Referring now to FIGS. 12–14, the operation of the transverse blade assembly 16 is shown in more detail. The housing 12 has a transverse control slot 50 defined therein, extending through end wall 51, and in communication with the guide channels 22, with the connecting arms 42 and the control arm 44 movably received in the control slot 50. Additionally, recessed storage channels 52 are defined in a side wall 53 of the housing 12 and in communication with the guide channels 22, for storing the blades 30 in a first retracted position (shown in solid lines in FIGS. 13 and 14). In this configuration, by transversely moving the handle 32, the blades 30 are guided by the guide channels 22 through the chamber 18 to a second position (shown in phantom lines in FIGS. 13 and 14), which slices the hot dogs transversely into pieces.

It will be noted that the channels 22 extend all the way through the chambers 18 so that the transverse blades 30 can be moved through the channels 22 and all the way across the chambers. In this way, the blades 30 sever the hot dogs into separate transverse pieces, instead of merely making the precooking slits of the prior art. Of course, additional blades can be provided for merely cutting slits in the hot dog, or the blades 30 can be moved only part of the way through the channels, as may be desired.

Figure 15:
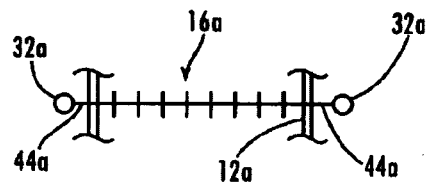
FIG. 15 is a plan view of a first alternative transverse blade assembly of the hot dog slicer of FIG. 1.
Figure 16:
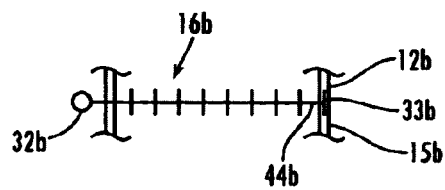
FIG. 16 is a plan view of a second alternative transverse blade assembly of the hot dog slicer of FIG. 1.
Figure 17:
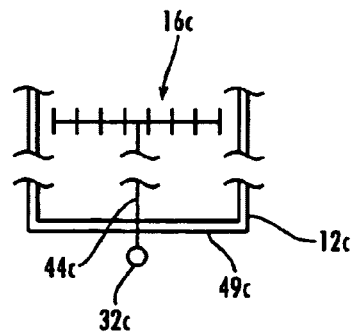
FIG. 17 is a plan view of a third alternative transverse blade assembly of the hot dog slicer of FIG. 1.

FIGS. 15–17 show various alternative embodiments of the transverse blade assembly 16. FIG. 15 shows a transverse blade assembly 16a having two handles 32a attached to two connecting arms 44a extending through the housing 12a, so that the blade assembly 16a can be operated from either side of the housing. FIG. 16 shows a transverse blade assembly 16b having a transverse guide member 33b extending from one of the connecting arms 44b (or one of the transverse blades) and riding in a transverse guide slot 15b in the housing 12b, with the guide member 33b oppositely positioned from the handle 32b, for providing a smoother sliding operation of the blade assembly 16b. FIG. 17 shows a transverse blade assembly 16c having the control arm 44c extending therefrom so that the handle 32c extends through the side wall 49c of the housing 12c. It will be understood that the transverse control slot, control arm, connecting arms, guide channels, and handles can be arranged in other ways to accomplish the desired transverse slicing.

Figure 18:
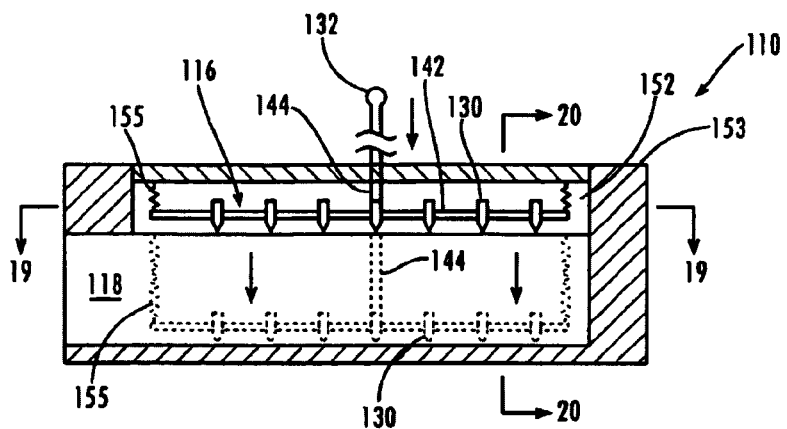
FIG. 18 is a longitudinal section view of a second exemplary embodiment of the present invention, showing a hot dog slicer with a top-mounted transverse blade assembly.
Figure 19:
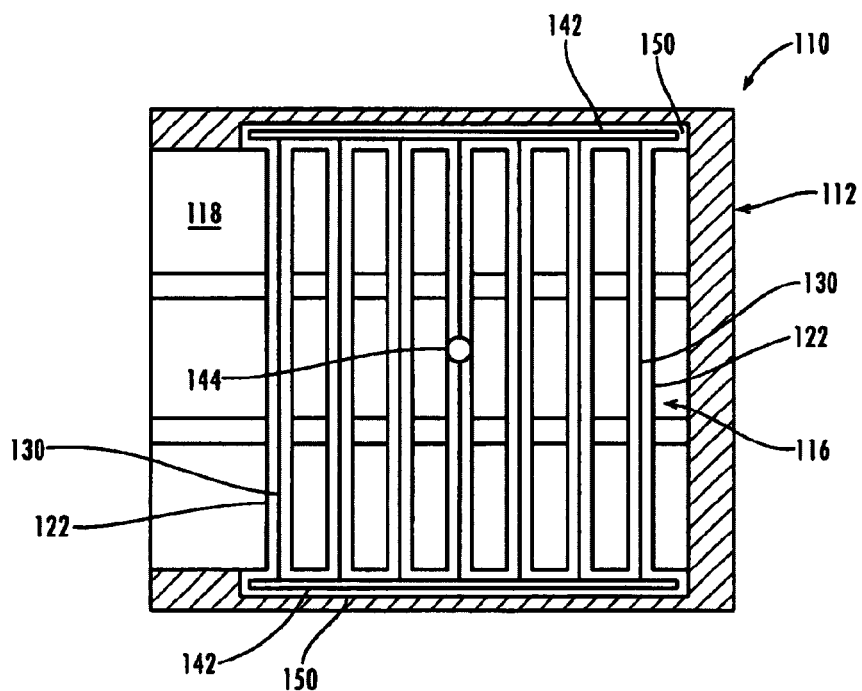
FIG. 19 is a section view of the hot dog slicer taken at line 19—19 of FIG. 18.
Figure 20:
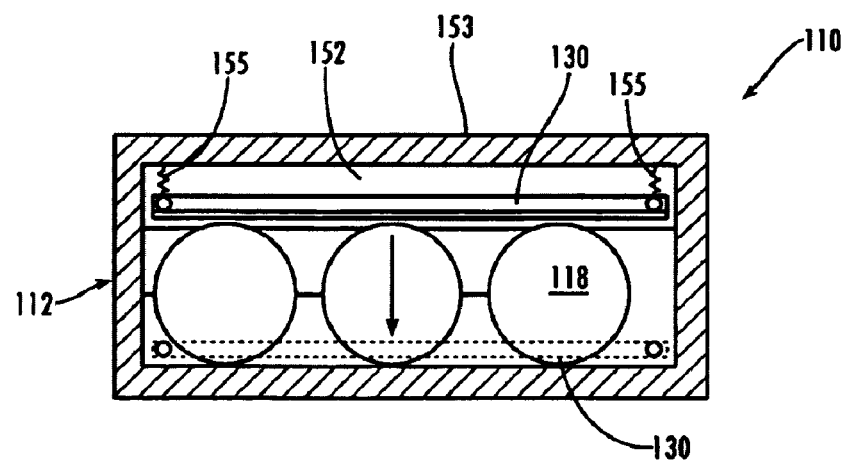
FIG. 20 is a section view of the hot dog slicer taken at line 20—20 of FIG. 18.

Referring now to FIGS. 18–20, there is illustrated a second exemplary embodiment of the present invention, referred to generally as the slicer 110. The slicer 110 has a housing 112 with chambers 118, guide channels 122, and a longitudinal blade assembly (not shown) that are similar to the first exemplary slicer 10. Also, the slicer 110 has a transverse blade assembly 116 with blades 130, connecting arms 142, a control arm 144, and a handle 132. Differently, though, the blades 130 are stored in storage channels 152 in the top wall 153 of the housing 112 when in a retracted first position (shown in solid lines in FIGS. 18 and 20), and two connecting arms 142 slide in two transverse control slots 150. By pushing down on the handle 132, the blades 130 are moved transversely downward through the chambers 118 while being guided by the guide channels from the first position to a second position (shown in phantom lines in FIGS. 18 and 20) with the transverse blades extended all the way through the chambers 118 to slice the hot dogs. Additionally, springs 155 can be attached to the transverse blade assembly 116 and to the housing 112 so that the blades 130 are biased from the second position towards the first retracted position and so that the springs are stretched (see FIG. 18) when the blades 130 are moved downward to slice the hot dogs.

Figure 21:
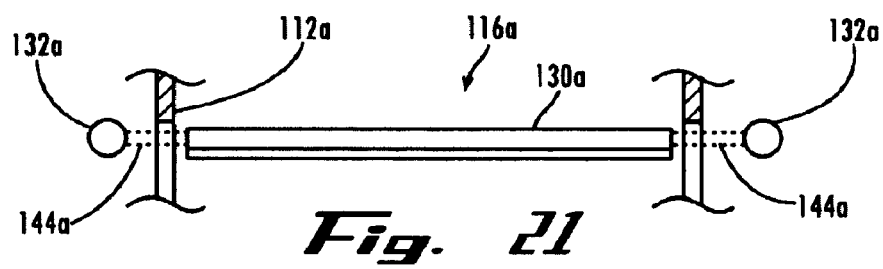
FIG. 21 is an elevation detail view of a first alternative transverse blade assembly of the hot dog slicer of FIG. 18.
Figure 22:
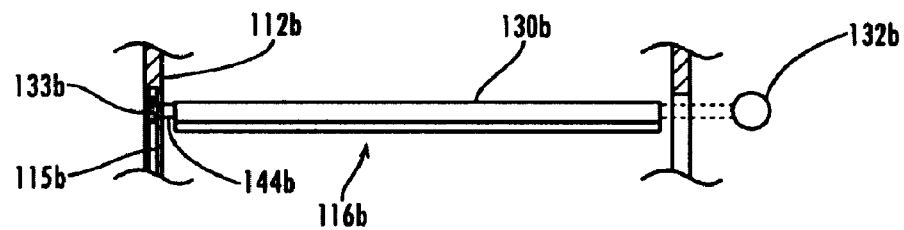
FIG. 22 is an elevation detail view of a second alternative transverse blade assembly of the hot dog slicer of FIG. 18.

FIGS. 21–22 show various alternative embodiments of the transverse blade assembly 116. FIG. 21 shows a transverse blade assembly 116a having two handles 132a attached to two connecting arms 144a extending through the housing 112a and attached to blade 130a, so that the blade assembly 116a can be operated from either side of the housing. FIG. 22 shows a transverse blade assembly 116b having a transverse guide member 133b extending from one of the connecting arms 144b (or one of the transverse blades 130b) and riding in a transverse guide slot 115b in the housing 112b, with the guide member 133b oppositely positioned from the handle 132b, for providing a smoother sliding operation of the blade assembly 116b. It will be understood that the transverse control slot, control arm, connecting arms, guide channels, and handles can be arranged in other ways to accomplish the desired transverse slicing.

Figure 23:
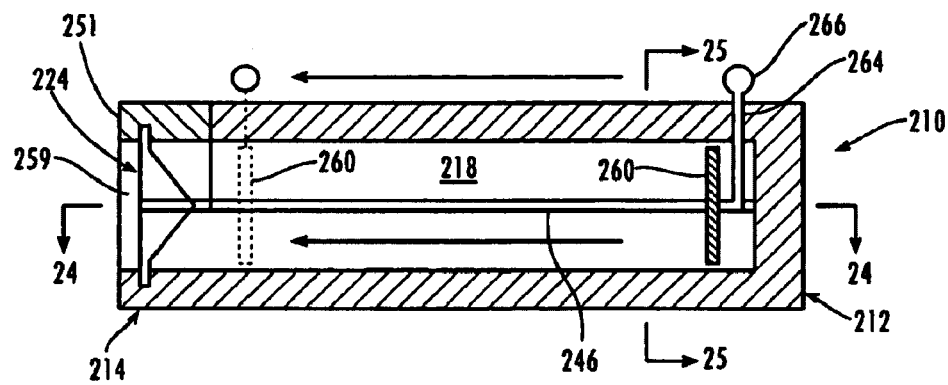
FIG. 23 is a longitudinal section view of a third exemplary embodiment of the present invention, showing a hot dog slicer with a fixed transverse blade assembly and a movable paddle assembly.
Figure 24:
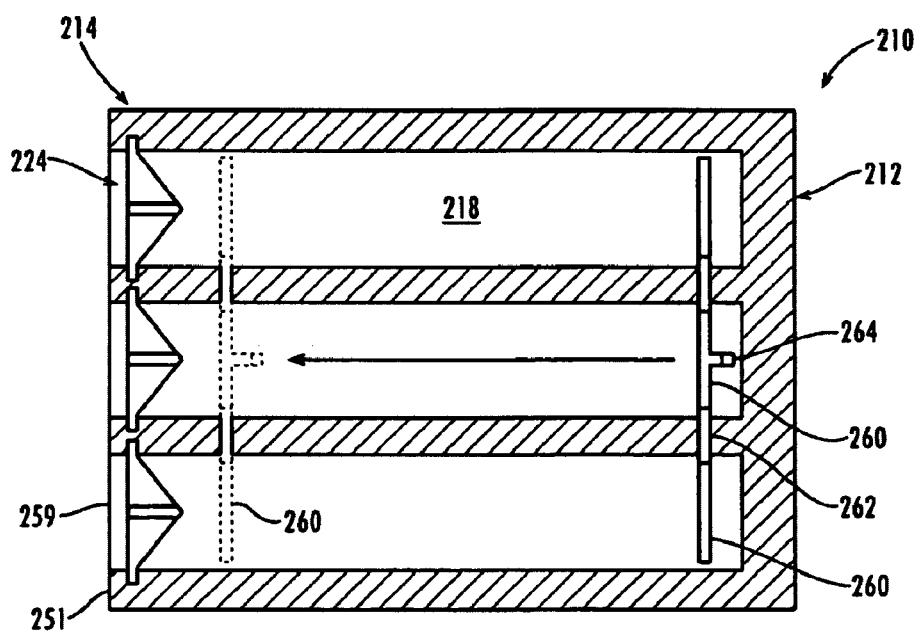
FIG. 24 is a section view of the hot dog slicer taken at line 24—24 of FIG. 23.
Figure 25:
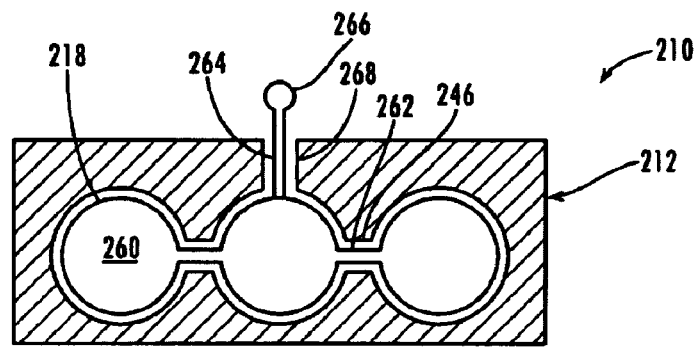
FIG. 25 is a section view of the hot dog slicer taken at line 25—25 of FIG. 23.

Referring now to FIGS. 23–25, there is illustrated a third exemplary embodiment of the present invention, referred to generally as the slicer 210. The slicer 210 has a housing 212 with chambers 218, connecting slots 246, guide channels (not shown), and a transverse blade assembly (not shown) that are similar to the first exemplary slicer 10. Differently, though, the slicer 210 has a longitudinal blade assembly 214 with a blade set 224 (each having four or another number of blade sections) fixed in each chamber 218 adjacent an opening 259 in an end wall 251 of the housing 212, for slicing the hot dogs lengthwise. Additionally, the slicer 210 includes a paddle assembly having paddle 260 in each chamber 218 and a connecting arm 262 extending between each of the paddles 260 and received through the connecting slots 246. A control arm 264 is connected to one of the paddles 260 (or to one of the connecting arms 262), a handle 266 is connected to the control arm 264, and a longitudinal control slot 268 in the housing 212 and in communication with one of the chambers 218 receives the control arm 264 therethrough. The number of paddles is the same as the number of chambers and transverse blade sets, so different embodiments may have a number of paddles other than the three shown.

In this configuration, by longitudinally moving the handle 266, the paddles 260 are longitudinally moved from a first position (shown in solid lines in FIGS. 23 and 24) to a second position (shown in phantom lines). This forces the hot dogs into contact with the blade sets 224 so that the hot dogs travel longitudinally as the blade sets slice through them, until the hot dogs exit the slicer 210 through the opening 259 now sliced longitudinally into quarters or another number of pieces.

Figure 26:
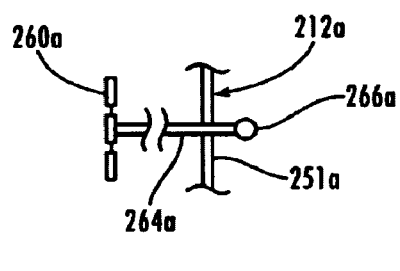
FIG. 26 is an elevation detail view of a first alternative paddle assembly of the hot dog slicer of FIG. 23.
Figure 27:
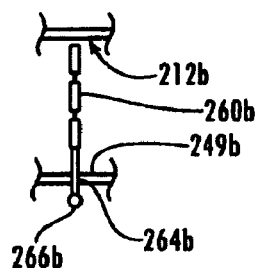
FIG. 27 is an elevation detail view of a second alternative paddle assembly of the hot dog slicer of FIG. 23.
Figure 28:
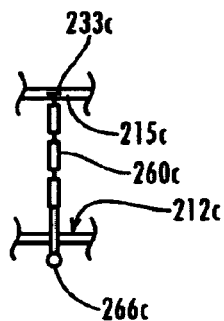
FIG. 28 is an elevation detail view of a third alternative paddle assembly of the hot dog slicer of FIG. 23.

FIGS. 26–28 show various alternative embodiments of the slicer 210 with paddles 260. FIG. 26 shows a handle 266a connected to a control arm 264a extending from the back of the paddles 260a and through an end wall 251a of the housing 212a, for operating the paddles 260a from the end instead of the top of the housing. FIG. 27 shows a handle 266b connected to a control arm 264b extending laterally from one of the paddles 260b and through a side wall 249b of the housing 212b, for operating the paddles 260b from the side instead of the top of the housing. FIG. 28 shows a transverse guide member 233c extending from one of the paddles 260c and riding in a transverse guide slot 215c in the housing 212c, with the guide member 233c oppositely positioned from the handle 266c, for providing a smoother sliding operation of the paddles 260c. It will be understood that the paddles, connecting arms, connecting slots, control arm, control slot, and handle can be arranged in other ways to accomplish the desired longitudinal slicing.

Referring now to FIGS. 29 and 30, there is shown a fourth exemplary embodiment of the present invention, generally referred to as the slicer 310, that is similar to the first exemplary slicer 10. In this embodiment, however, the housing 312 has a base 380 and an insert tray 382 with chambers 318. The insert tray 382 can have a clamshell configuration with interior facing walls that are recessed to cooperatively form the chambers, an open end for sliding the hot dogs into the chamber, or another arrangement. To use the slicer, the hot dogs are inserted into the chambers 318 in the tray 382, the tray is slid into the base 380, and the blade assemblies are operated.

Figure 31:
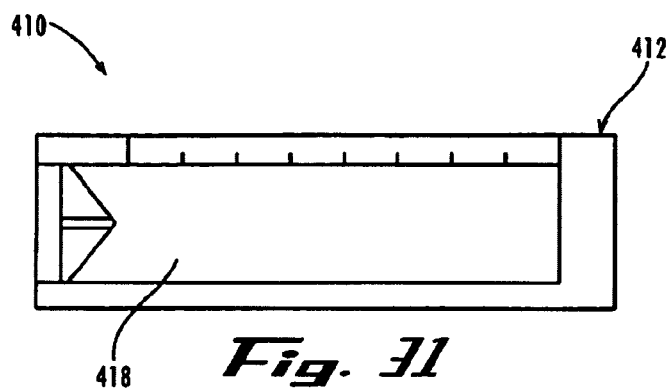
FIG. 31 is a side section view of a fifth exemplary embodiment of the present invention, showing a hot dog slicer having a housing with a single hot dog chamber.
Figure 32:
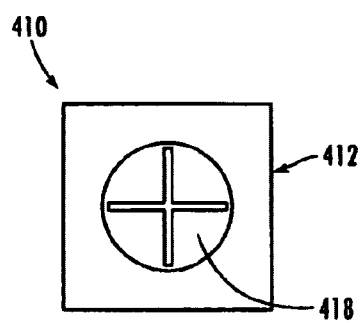
FIG. 32 is a longitudinal section view of the hot dog slicer of FIG. 31.

Referring now to FIGS. 31 and 32, there is shown a fifth exemplary embodiment of the present invention, generally referred to as the slicer 410, that is similar to the first exemplary slicer 10. In this embodiment, however, the housing 412 has only a single chamber 418, as may be desired for home use.

Figure 33:
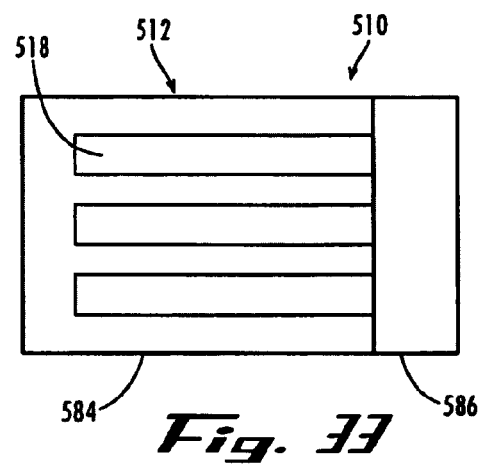
FIG. 33 is a top section view of a sixth exemplary embodiment of the present invention, showing a hot dog slicer having a housing with a base and an end lid.
Figure 34:
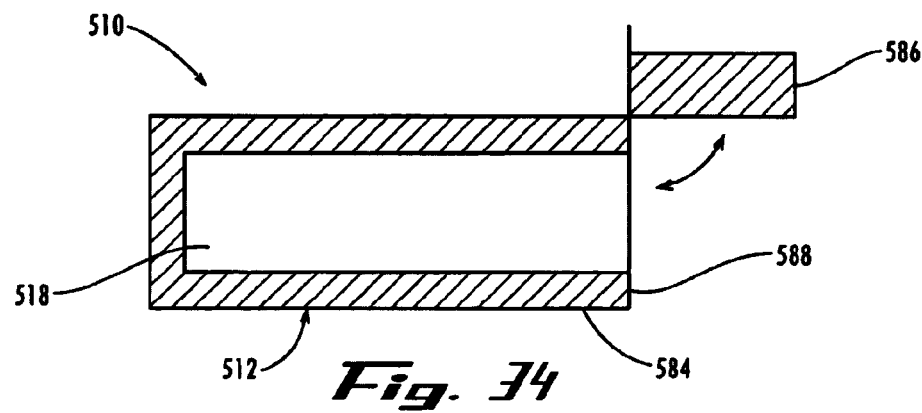
FIG. 34 is a side section view of the hot dog slicer of FIG. 33, showing the lid swung open so that a hot dog can be inserted into the base.

Referring now to FIGS. 33 and 34, there is shown a sixth exemplary embodiment of the present invention, generally referred to as the slicer 510, that is similar to the first exemplary slicer 10. In this embodiment, however, the housing 512 has a base 584 and a lid 586 hingedly coupled to and end of the base (instead of to the top of the base of the slicer 10). The base 584 has chambers 518 formed therein that extend through an end wall 588 of the base 584 so that the lid 586 covers the chambers when closed and exposes them when open. In this embodiment, to slice hots dogs, the lid 586 is swung open, the hot dogs are slid into the chambers 518, the lid 586 is swung closed, and the blade assemblies are operated.

In view of the foregoing, it will be appreciated that present invention provides a hot dog slicer for quartering hot dogs lengthwise and also slicing dogs laterally into disc sections so that the resulting pieces are small enough that children do not choke on them. Additionally, the slicer can be used to slice a number of hot dogs simultaneously, and is safe and easy to use.

While certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

In the embodiments described above and the following claims, the use of singular or plural forms of a term is not intended to limit the term to that form, unless specified otherwise herein. Thus, the words "a," "an," and "one" are not intended to mean "only one" but can also mean "more than one."

The invention claimed is:

1. A slicer for food products, comprising:
   a) a housing having a plurality of elongate chambers defined therein for receiving the products, a plurality of spaced apart channels transversely defined therein with the channels extending all the way through the chambers, a connecting slot defined therein and extending between each of the chambers, a longitudinal control slot defined therein and in communication with the chambers, and a transverse control slot defined in and in communication with the guide channels;
   b) a longitudinal blade assembly having a plurality of sets of four radially arranged blade sections, each blade set disposed within one of the chambers with the blade sections of that set extending transversely all the way across that chamber, the blade sets longitudinally movable between a first position and a second position, a connecting arm extending between each of the blade sets and movably received in the connecting slot, a first control arm connected to one of the blade sets and extending through the longitudinal control slot, and a first handle connected to the first control arm, wherein moving the first handle moves the blade set from the first to the second position which slices the products longitudinally into quarters; and
   c) a transverse blade assembly having a plurality of transverse blades that are received in the channels, the blades transversely movable between a first position and a second position, at least one connecting arm extending between each of the blades, a second control arm connected to one of the blades and extending through the transverse control slot, and a second handle connected to the second control arm, wherein moving the second handle moves the blades from the first to the second position which slices the products transversely into a plurality of pieces.

2. The slicer of claim 1, wherein the chambers have a generally tubular shape.

3. The slicer of claim 1, wherein each of the blade sections has a generally triangular shape.

4. The slicer of claim 1, wherein the housing comprises a base section and a lid section hingedly coupled to the base section, wherein at least a portion of the chambers are defined in the base section.

5. The slicer of claim 1, wherein the housing comprises a base section and an insert section that is removably receivable within the base section, wherein the chambers are defined in the insert section.

6. The slicer of claim 1, wherein the longitudinal blade assembly includes a longitudinal guide member extending from one of the blade sections or connecting arms into a longitudinal guide slot defined in the housing, and wherein the transverse blade assembly includes a transverse guide member extending from one of the transverse blades or the connecting arms into a transverse guide slot defined in the housing.

7. A slicer for elongate food products, comprising:
   a) a housing defining a plurality of elongate chambers and a plurality of spaced-apart transverse guide channels, wherein the elongate chambers are configured to receive a plurality of the elongate products, and the transverse guide channels are arranged transverse to the elongate chambers and extending transversely all the way through all of the chambers;
   b) a longitudinal blade assembly having a plurality of sets of longitudinally slicing non-concentric blade sections, each longitudinal blade set disposed within and corresponding to one of the elongate chambers, with the longitudinal non-concentric blade sections of each of the longitudinal blade sets extending transversely all the way across the corresponding elongate chamber and adapted to simultaneously longitudinally slice the products transversely all the way through into a plurality of longitudinal pieces each having a smaller longitudinal cross-sectional periphery than the unsliced product; and
   c) a transverse blade assembly having a plurality of transverse blades that are received in the transverse guide channels, the transverse blades being transversely movable independently of the longitudinal blade assembly and adapted to simultaneously transversely slice the products transversely all the way through into a plurality of transverse pieces.

8. The slicer of claim 7, wherein the chambers each have a generally tubular shape.

9. The slicer of claim 7, wherein each of the longitudinal blade sets comprises four of the longitudinal blade sections in a radial arrangement to slice the products longitudinally into longitudinal quarters.

10. The slicer of claim 7, wherein each of the longitudinal blade sections has a generally triangular shape.

11. The slicer of claim 7, wherein the housing comprises a base section and a lid section hingedly coupled to the base, wherein at least a portion of the chambers are defined in the base section.

12. The slicer of claim 7, wherein the housing comprises a base section and a insert section that is removably receivable within the base section, wherein the chambers are defined in the insert section.

13. The slicer of claim 7, wherein the longitudinal blade sets are longitudinally movable to slice the products into the longitudinal pieces.

14. The slicer of claim 13, wherein the longitudinal blade assembly further comprises one or more connecting arms extending between each of the longitudinal blade sets.

15. The slicer of claim 7, wherein the longitudinal blade sets are fixed and further comprising a plurality of movable paddles adapted to move the products into engagement with the longitudinal blade sets to slice the products into the longitudinal pieces.

16. The slicer of claim 15, further comprising a control arm connected to the paddles and a handle connected to the control arm, wherein moving the handle moves the paddles.

* * * * *